Dec. 17, 1940.   R. V. BROMLEY   2,225,409
MACHINE TOOL AND METHOD OF CONTROLLING SAME
Filed Sept. 30, 1938   3 Sheets-Sheet 1
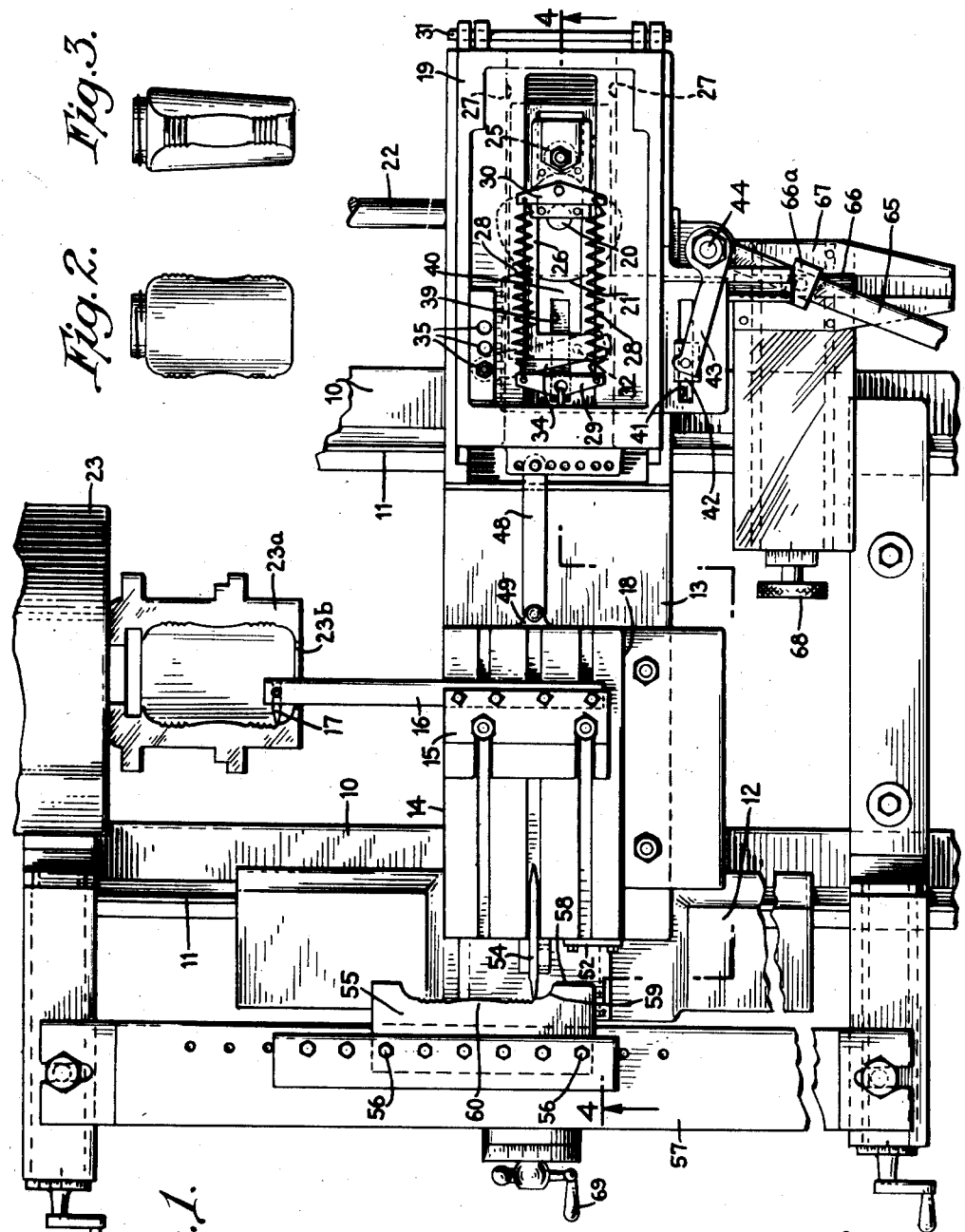
Inventor
*Raymond V. Bromley*
By *H. C. Diesem*
Attorney

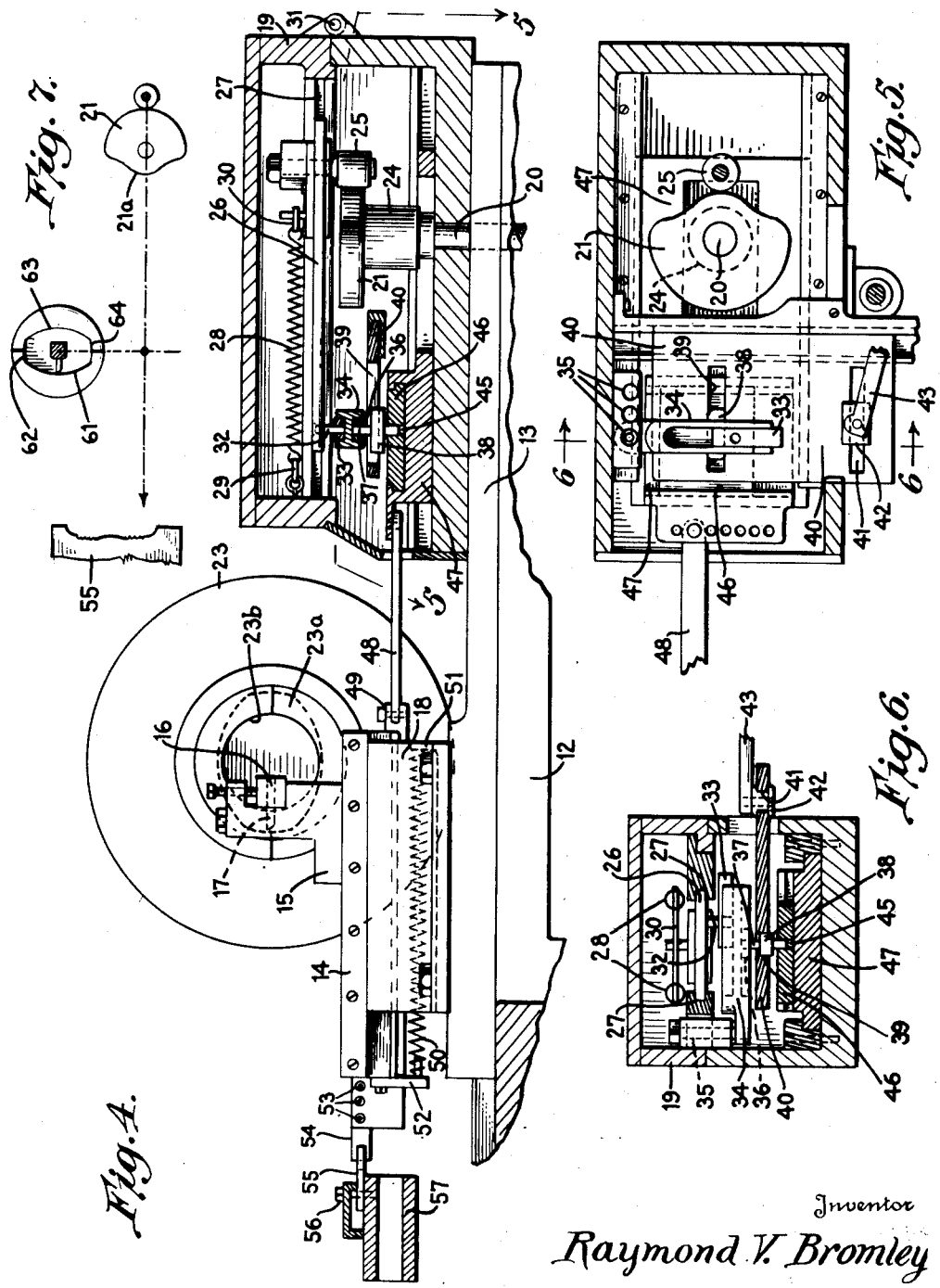

Dec. 17, 1940.   R. V. BROMLEY   2,225,409
MACHINE TOOL AND METHOD OF CONTROLLING SAME
Filed Sept. 30, 1938   3 Sheets-Sheet 3

Inventor
Raymond V. Bromley
By H. C. Chiesem
Attorney

Patented Dec. 17, 1940

2,225,409

UNITED STATES PATENT OFFICE 2,225,409

MACHINE TOOL AND METHOD OF CONTROLLING SAME

Raymond V. Bromley, Washington, Pa., assignor to Hazel-Atlas Glass Company, Wheeling, W. Va., a corporation of West Virginia Application September 30, 1938, Serial No. 232,512

16 Claims. (Cl. 82—19)

This invention relates to machine tools, particularly of the lathe type, and has special reference to the automatic control of the cutting tool in such a way as to enable the production of a wide variety of different designs.

While the invention is of general application, it is particularly suited for use in the production of molds used in the formation of molded glass articles, such as bottles, jars, tumblers, and the like.

The invention is especially applicable to a lathe of the type disclosed in the application of Alvie E. Kelley, Ser. No. 8,937, filed on March 1, 1935. A lathe of this type is capable of producing a wide variety of designs and when the machine is provided with a particular pattern or control cam, it may be operated repeatedly to produce a mold of the same configuration. However, there is a limitation to the designs capable of being produced on this machine in that the designs must be of substantially uniform character throughout the length of the mold or other article being worked. Provision is made for varying the cross-sectional size of the design, as by way of producing a tapered effect from one end to the other, and a few other variations may be made but it is not possible to provide at will a distinctly different configuration at one point of a mold or other article from what is provided at other points axially in line therewith.

It is a primary object of the present invention to provide a method and means of controlling the cutting tool that will result in the production of panels in a mold, for example, that have special configurations at certain points and different configurations at other points along their length. For this purpose the invention contemplates the joint control of the cutting tool by devices of the character set forth in the Kelley application, above mentioned, and by profiling means, which become automatically effective during certain portions of the cycle of operation of the machine. Thus, in the production of a mold in accordance with the invention, certain panels will be produced under the control of mechanism of the Kelley type while other panels will be produced under the control of profiling means, the machine being arranged to pass automatically from one control to the other during each cycle of operation, as during each revolution of a control shaft or the like. In producing a mold having four panels, for example, the Kelley devices may be rendered effective twice during each revolution of the mold while the profiling means may be made effective at two other or alternate times during each revolution of the mold.

With these and other objects and advantages in view, an illustrative form of the invention will now be described in detail in conjunction with the accompanying drawings forming a part hereof and in which:

Fig. 1 is a top plan view of a portion of the machine embodying the improved control devices, only one section or half of the mold being operated upon being shown.

Fig. 2 is a front view of a jar produced from the mold formed under the control of the devices illustrated in Fig. 1.

Fig. 3 is a side view of the jar.

Fig. 4 is a transverse vertical section through a portion of the machine along the line 4—4 of Fig. 1.

Fig. 5 is a horizontal sectional view along the line 5—5 of Fig. 4.

Fig. 6 is a transverse vertical section along the line 6—6 of Fig. 5.

Fig. 7 is a schematic view illustrating the relation between the mold, the cutting tool and the tool control devices embodied in the illustrative machine.

Figure 8:
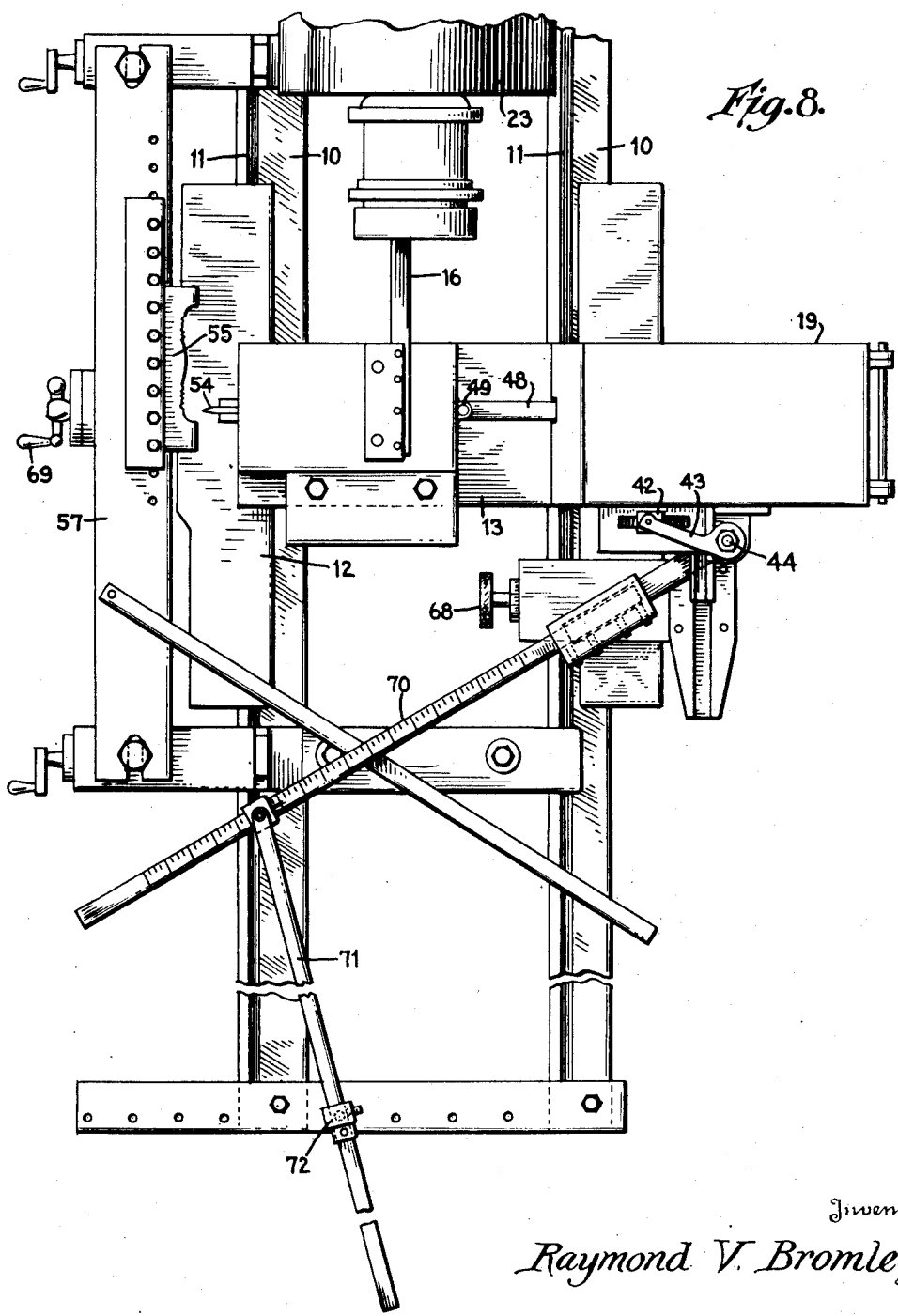
Fig. 8 is a top plan view of a portion of the machine on a somewhat smaller scale than Fig. 1 and illustrates certain additional controlling devices that may be employed.

For the purpose of illustrating the invention, it has been shown applied to a machine of the general type disclosed in the above-mentioned Kelley application. If desired the machine might be made substantially identical with that disclosed in the Kelley application with the addition thereto of the novel control features of the invention; however, as herein illustrated the improved machine differs somewhat in construction even aside from the addition of novel control features. As will appear more clearly as the detailed description progresses, the machine of the present disclosure employs a control pattern or cam which is rotated in a horizontal plane, i. e., about a vertical axis, whereas in the Kelley case the pattern or control cam is rotated in a vertical plane, i. e., about a horizontal axis. The illustrative machine will be found to differ from the disclosure of the Kelley application in various other respects also, but in general the principle of operation of the machine to which the improved control features are shown applied may be said to be substantially the same as that of the Kelley machine; it will be understood that features of the Kelley disclosure not illustrated in the present drawings may be employed, if desired.

Referring now to the drawings, the machine comprises a main frame or supporting structure, portions of which are indicated at 10, these being provided with guideways 11 along which a carriage 12 is adapted to shift. Mounted on the carriage 12 is a cross slide 13 adapted to be shifted transversely of the carriage along suitable guideways, not shown. Upon a portion of the cross slide 13, adjacent one end, is mounted a tool slide 14 carrying adjustably thereon a tool holder 15 adapted to retain adjustably a tool carrier 16 supporting a cutting tool 17. The slide 14 is carried by guides 18 secured to the cross slide and adapted to permit free movement of the tool slide longitudinally of the cross slide.

Adjacent the opposite end of the cross slide there is carried thereby a housing 19 which encloses the control devices of the Kelley type. These control devices include a shaft 20 carrying at its upper end a control pattern or cam 21, this shaft extending vertically into the housing and being connected by bevel gears, or the like, with a horizontally extending shaft 22. The shaft 22 in turn is suitably connected through gearing, not shown, with the same source which operates the work supporting chuck 23. It will be understood that by appropriate change of gearing, the relative speeds of rotation of the shaft 22 and chuck 23 may be varied to suit the particular requirements of the work in hand. It will also be understood that the bevel gearing, or the like, which connects the shafts 20 and 22, is such as to permit the sliding of the carriage 12 longitudinally of the shaft 22 without interfering with the driving connection between these shafts.

The control pattern or cam 21 is detachably secured to the upper end of the shaft 20 in such a way as to be readily removed therefrom and replaced by another control pattern whenever desired. It is preferably supported by a collar 24 secured to the shaft adjacent its upper end. The form of the control pattern will, of course, vary according to the configuration of the mold or other article to be produced. The shape of the pattern illustrated in the drawings is such as to produce a mold of the type illustrated, which will in turn provide a jar of the configuration in Figs. 2 and 3. In the production of the mold 23a (Fig. 1) the pattern 21 is designed to rotate through two complete revolutions for a single revolution of the mold. In producing molds of other shapes, the ratio between the revolution of the shaft 20 and the chuck 23 may be different, i. e., 3 to 1 or 4 to 1 or some other suitable ratio, depending upon the number of times a particular panel is repeated around the mold and other factors.

Cooperating with the periphery of the control pattern 21 is a small roller 25 secured in any suitable way to a slide 26 adapted to shift freely in guideways 27 formed in the housing 19. The roller 25 is urged against the periphery of the pattern 21 by means of a pair of springs 28 attached at one end to a yoke 29 secured to the front wall of the housing 19 and at their opposite ends to a yoke 30 secured to the slide 26. As will be explained more fully hereinafter, the springs 28 are primarily intended to take up the back-lash in the control mechanism while other, stronger springs are provided for urging the roller 25 against the control pattern 21 and simultaneously urging other parts, to be described, in the same direction. The housing 19 is preferably formed in two sections pivoted at 31, the slide 26 being mounted in the upper section of the housing. In this way access is provided to the control pattern 21 to permit ready substitution of another pattern by simply raising the forward end of the upper section of the housing.

At the forward end of the slide 26 is provided a downwardly extending pin 32 which pivotally carries a slide block 33. This block is slidably carried by a channel in the upper side of an arm 34 pivoted to the housing 19 at any one of a series of points 35. The pivot pin by which the arm 34 is pivotally connected with the housing 19 is adapted to be readily removed and shifted to any one of the openings 35.

The under side of the arm 34 is also channeled to receive a slide block 36 connected by a pin 37 with another slide block 38 slidable in a transverse slot 39 in a slide 40. The slide 40 is suitably mounted in a guideway extending transversely of the housing 19, thereby enabling the slide 40 to be shifted freely, transversely of the housing. Beyond the side of the housing the slide 40 is provided with another transversely extending slot 41 which slidably receives a block 42 pivotally carried by an arm 43 mounted at 44 upon an ear extending from the housing 19. As will be explained more fully hereinafter, this provides for the automatic shifting of the slide 40 under certain conditions.

A downward extension of the pin 37 beneath the slide block 38 cooperates with an opening 45 in a slide 46 carried in suitable guideways provided on a slide 47. The latter is in turn mounted in suitable guideways in the housing 19 and is adapted to shift longitudinally of this housing. At the forward end of the slide 47 there is attached a link 48 which passes through an opening in the housing 19 and is connected at its forward end with an extension 49 of the tool slide 14. It will thus be seen that any movement of the slide 47 longitudinally of the housing 19 will be imparted to the tool slide 14. A pair of springs 50, compressed between a portion 51 of the cross slide 13 and downwardly extending plates 52 secured to the tool slide 14, serves to urge the latter toward the left in Fig. 1, thereby urging the cutting tool 17 in the same direction and at the same time assisting the springs 28 in urging the roller 25 in this direction against the periphery of the pattern or cam 21. The springs should be sufficiently strong to hold the tool against the work without objectionable chattering in taking a desired cut.

Secured in any suitable way to the forward end of the tool slide 14, preferably adjustably by means of set-screws 53, is a feeler pin 54. This pin is adapted to cooperate with a profile plate or cam 55 secured in any suitable way, preferably adjustably by means of bolts 56, to a portion 57 of the main frame of the machine.

Now, in accordance with the present invention the cutting tool 17 is repeatedly placed alternately under the control of the pattern 21 and then the profile 55. For this purpose the following relationship may be provided between the pattern and the profile: When the machine is first set into operation, the carriage 12 is adjusted to such a position that the feeler pin cooperates with the high part 58 of the profile. At this time the cutting toool will be outside of the mold 23a and just approaching the opening 23b therein. As the carriage shifts inwardly toward the chuck 23, the cutting tool may cooperate with the wall of the opening 23b and finish the latter. At this time the tool slide 14 and the connected parts, including the slide 26 and roller 25, will be held so far to the right in Fig. 1 that the roller will not cooperate with any portion of the pattern 21. However, as the carriage continues to move inwardly toward the chuck and the feeler pin is presented to the receding portion 59 of the profile, a point will soon be reached at which the roller 25 will engage the portions of greatest radius of the pattern 21. Whenever the pattern is so engaged by the roller 25, it will be apparent that the cutting toool 17 will be under the control of the pattern. However, when the lower points, or points of shorter radius, on the pattern are presented opposite the roller 25, the tool slide will again be placed under the control of the profile 55. The relationship between the pattern 21 and the profile is such that even when the bottom or innermost portion 60 of the profile is presented opposite the feeler pin, the relieved portion 21a of the pattern will be clear of the roller 25 and will thus place the tool slide under the control of the profile rather than the pattern while the higher portions, or portions of greater radius, of the pattern will take control of the tool slide and leave the profile ineffective. Thus, upon each revolution of the shaft 20 and pattern 21 the cutting tool 17 will be placed alternately under the control of the pattern and under control of the profile. Each of these controls will be rendered alternately effective and ineffective.

Considering the contour of the inner surface of the mold, as indicated in Fig. 7, it will be clear that upon one revolution of the pattern 21 the cutting tool will be under the control of the pattern as it traverses the surface 61 of the mold. However, the cutting tool will be placed under the control of the profile as it traverses the surface 62 of the mold. On the next revolution of the pattern 21 the cutting tool will again be placed under the control of the pattern in traversing the surface 63 of the mold but will be placed under the control of the profile in traversing the surface 64 of the mold. This enables the production of a mold which will form a jar of the type illustrated in Figs. 2 and 3. The broad, smooth sides of the mold forming this jar are produced under the control of the pattern while the grooved or scalloped side panels of this mold are produced under the control of the profile. Obviously, a wide variety of configurations may be imparted to the side panels of the mold by appropriately forming the profile pattern. Similarly, a wide variety of different configurations may be imparted to the smooth sides of the mold by appropriately varying the pattern 21 and the other controls of the Kelley type.

Briefly reviewing the control of the tool slide by the pattern 21, it will be understood that for a given throw of the cam or pattern, the tool slide may be shifted to a greater or lesser extent, depending upon the position of the slide block 36 in the channel of the arm 34. If this block is so positioned as to place the pin 37 relatively close to the pivot 35 of the arm, the movement of the tool slide will be small in comparison with the movement of the roller 25. On the other hand, if the slide block 36 is shifted toward the free end of the arm 34 so as to place the pin 37 at a greater distance from the pivot 35 of the arm, the movement of the tool slide will correspond more nearly with the movement of the roller and may, if desired, be made to exceed the movement of the roller. As explained in the Kelley application the arm 43 may be rocked automatically in the course of operation of the machine to shift the slide 40 and thus vary the movement of the tool slide in response to a given movement of slide 26. Thus the arm may be rocked to compensate automatically for the shifting of cross slide 13 which carries the cutter 17 toward or away from the axis of the mold. For this purpose an arm 65 may be secured to the pivot 44 of the arm 43 and this arm may be provided with a slidable block 66a connected pivotally with another block 66 adapted to slide in a groove in a guide member 67. The latter is supported from the main frame of the machine in such a way as to permit its adjustment in a direction transversely of the guideways 11 by means of a hand wheel or knob 68. It will be apparent that as the cross slide 13 is shifted transversely of the guideways 11 the pivot 44 will be similarly shifted while the block 66 will remain in the position determined by the adjustment of the guide member 67, thereby rocking the pivot and the arm 43. In this way, as the cutting tool is brought closer to the axis of the mold, due to either manual or automatic adjustment of the cross slide, the movement of the tool slide in relation to the movement of the slide 26 will be automatically reduced, and vice versa. Manual adjustment of the cross slide may be effected by means of the handle 69. If desired the cross slide may be adjusted automatically by disconnecting it from the feed screw (not shown) associated with the handle 69 and placing it under control of a cam or template. Thus, as the carriage 12 advances in the course of a cutting stroke a cam or template may urge the cross slide in one direction or the other and thereby vary the size of the contour determined by the pattern 21.

As further explained in the Kelley application above mentioned, the position of the slide block 36 may be varied automatically as the cutting tool 17 advances axially of the mold so as to produce a tapered effect upon those walls of the mold whose contour is determined by the pattern 21. For this purpose it is simply necessary to connect the pivot 44 of the arm 43 with some fixed portion of the frame, as by means of an arm 70 connected with the pivot pin 44 and also connected by means of a link 71 with a point 72 on the main frame. It will be apparent that with this arrangement, as the carriage 12 shifts toward the mold in the direction of its axis, the pivot pin 44 wil be turned slightly counter-clockwise and will cause the slide 40 to be shifted in such a direction as to carry the block 36 further away from the pivot 35 of the arm 34. In this way the stroke of the cutting tool 17 under the control of the pattern will be increased as the tool advances toward the inner end of the mold. If the reverse effect is desired, the arm 70 and the link 71 may be swung to the opposite side of a line connecting the points 44 and 72 so that as the carriage 12 shifts inwardly along the axis of the mold, the arm 43 will be rocked in a clockwise direction (Fig. 8). The rate at which the change in the angular position of the arm 43 is brought about may be varied by varying the effective lengths of the arm 70 and link 71 and by changing the point of connection of the latter with the main frame.

The operation of the various control devices has been explained in such detail in the foregoing that no further resume of the operation is believed to be necessary. It should be understood, however, that the patterns to be mounted on the shaft 20 are capable of being produced readily and speedily upon the same machine. Thus in the formation of a particular pattern, such as the one indicated in the drawings, a master pattern is first formed having a contour substantially like that to be imparted to the surface of the mold in a transverse plane, as indicated by the lines 61, 62, 63, and 64 in Figure 7. The ends of the master pattern, however, corresponding with the lines 62 and 64 of the mold, are extended somewhat beyond these lines, i. e. the curvature of the sides 61 and 63 will be continued somewhat further in the master pattern so that the latter will be more elongated than the cross section of the mold. This master pattern is mounted on the chuck in lieu of the mold and a tracer, in the form of a roller or a pointed pin, depending upon whether rounded or sharp corners are desired in the mold, is substituted for the cutter 17. A flat plate is mounted on the shaft 20 and the upper surface of this plate is preferably coated so as to enable a desired contour to be readily traced thereon. The roller 25 and its support are removed thus leaving an opening through the slide 26 in line with the usual axis of the roller. This permits a stylus or the like to be passed through the opening and trace on the surface of the plate an outline determined by the shifting of slide 26 in response to the movement of the tracer as the master pattern is rotated. The plate may then be cut in any suitable way to approximately the outline formed on its surface. Its contour may be finished to precisely the desired form by applying a small motor and a milling cutter to the slide 26, the cutter being of the same size and being arranged in the same position as the roller 25. Upon slowly turning the chuck 23 and the shaft 20 as the milling cutter rotates at a suitable cutting speed the periphery of the pattern may be appropriately finished. It will be understood that during these operations the profile 55 will be removed from the machine or otherwise rendered effective.

While the novel control means and method have been described in considerable detail in connection with the illustrative form of the invention it will be understood that numerous variations or modifications may be made of the several parts and their relation to each other as well as their mode of operation without departing from the general principles and scope of the invention. The terms and expressions employed herein have been used as terms of description and not of limitation.

What I claim is:

1. In a machine of the class described means for supporting and rotating a work piece, a holder adapted to retain a cutting tool, means for shifting said holder slowly along the work piece, a slide shiftable to move the holder toward and from the work piece as the latter is rotated, and a plurality of means constructed and arranged for alternately controlling the movement of said slide during each rotation of the work piece.

2. In a machine of the class described means for supporting and rotating a work piece, a holder adapted to retain a cutting tool, means for shifting said holder slowly along the work piece, a slide shiftable to move the holder toward and from the work piece as the latter is rotated, and a profile and a revolving member constructed and arranged for alternately controlling the movement of said slide.

3. In a machine of the class described means for supporting and rotating a work piece, a holder adapted to retain a cutting tool, means for shifting said holder slowly along the work piece, a slide shiftable to move the holder toward and from the work piece as the latter is rotated, and a stationary control member and a revolving control member constructed and arranged for alternately controlling the movement of said slide during rotation of the work piece.

4. In a machine of the class described means for supporting and rotating a work piece, a holder adapted to retain a cutting tool, means for shifting said holder to feed the cutter along the work piece, supporting means shiftable to move the holder relative to the work piece upon each revolution of the latter to determine the configuration of the surface being machined, a profile member, and rotatable means constructed and arranged for alternately controlling said supporting means and then placing the same under control of said profile member.

5. In a machine of the class described means for supporting and rotating a work piece, a holder adapted to retain a cutting tool, means for shifting said holder to feed the cutter along the work piece, supporting means shiftable to move the holder relative to the work piece upon each revolution of the latter to determine the configuration of the surface being machined, a profile member for determining the position of said supporting means during a portion of each revolution of the work piece, and a pattern member constructed and arranged for controlling said supporting means and determining the position of said holder during another portion of each revolution of the work piece.

6. In a machine of the class described means for supporting and rotating a work piece, a holder adapted to retain a cutting tool, means for shifting said holder to feed the cutter along the work piece, means for shifting the holder relative to the work piece upon each revolution of the latter to determine the configuration of the surface being machined, said last-mentioned means including a slide for supporting said holder and spring means for urging said slide in one direction, a profile member for limiting movement of said slide in said direction, and rotatable means constructed and arranged for intermittently determining the position of said slide independently of said profile member.

7. In a machine of the class described means for supporting and rotating a work piece, a holder adapted to retain a cutting tool, means for shifting said holder to feed the cutter along the work piece, means for shifting the holder relative to the work piece upon each revolution of the latter to determine the configuration of the surface being machined, said last-mentioned means including a slide for supporting said holder and spring means for urging said slide in one direction, a pattern member rotated in synchronism with said work piece and arranged to determine the position of said slide during a portion of each revolution of the work piece, and a profile member constructed and arranged to determine the position of said slide independently of said pattern member during another portion of each revolution of the work piece.

8. In a machine of the class described means for supporting and rotating a work piece, a holder adapted to retain a cutting tool, means for shifting said holder to feed the cutter along the work piece, means for shifting the holder relative to the work piece upon each revolution of the latter to determine the configuration of the surface being machined, said last-mentioned means including a slide for supporting said holder and spring means for urging said slide in one direction, a pattern member rotated in synchronism with said work piece, means connected with said slide and controlled by said pattern for determining the position of the slide during a portion of each rotation of the pattern, and a profile member constructed and arranged to determine the position of said slide independently of said pattern member during another portion of the rotation of the pattern.

9. In a machine of the class described means for supporting and rotating a work piece, a holder adapted to retain a cutting tool, means for shifting said holder to feed the cutter along the work piece, means for shifting the holder relative to the work piece upon each revolution of the latter to determine the configuration of the surface being machined, said last-mentioned means including a slide for supporting said holder and spring means for urging said slide in one direction, a pattern member rotated in synchronism with said work piece, means connected with said slide and controlled by said pattern for determining the position of the slide during a portion of each rotation of the pattern, the connection between said means and said slide being such as to provide a movement of said slide different from the variations in said pattern, and a profile member constructed and arranged to determine the position of said slide independently of said pattern member during another portion of the rotation of the pattern.

10. In a machine of the class described means for supporting and rotating a work piece, a holder adapted to retain a cutting tool, means for shifting said holder to feed the cutter along the work piece, means for shifting the holder relative to the work piece upon each revolution of the latter to determine the configuration of the surface being machined, said last-mentioned means including a slide for supporting said holder and spring means for urging said slide in one direction, a pattern member rotated in synchronism with said work piece, means connected with said slide and controlled by said pattern for determining the position of the slide during a portion of each rotation of the pattern, the connection between said means and said slide being variable so as to provide for a variable movement of the slide in response to a given configuration of the pattern, means for automatically varying said connection, and a profile member arranged to determine the position of said slide during another portion of the rotation of the pattern.

11. In a machine of the class described means for supporting and rotating a work piece, a carriage shiftable axially of the work piece supporting means, a slide mounted on said carriage for movement transversely of the axis of said means, a cutting tool carried by said slide, means for advancing the carriage to feed the cutting tool along the work piece, and a plurality of means cooperating with said slide and constructed and arranged to be separately effective for determining the position of the slide on the carriage during different portions of a rotation of the work piece.

12. In a machine of the class described means for supporting and rotating a work piece, a carriage shiftable axially of the work piece supporting means, a slide mounted on said carriage for movement transversely of the axis of said means, a cutting tool carried by said slide, means for advancing the carriage to feed the cutting tool along the work piece, and a stationary profile member and a rotatable pattern member cooperating with said slide and constructed and arranged to be separately effective for determining the position of the slide on the carriage during different portions of a rotation of the work piece.

13. In a machine of the class described means for supporting and rotating a work piece, a carriage shiftable axially of the work piece supporting means, a slide mounted on said carriage for movement transversely of the axis of said means, a cutting tool carried by said slide, means for advancing the carriage to feed the cutting tool along the work piece, a stationary profile member and a rotatable pattern member cooperating with said slide and constructed and arranged to be separately effective for determining the position of the slide on the carriage during different portions of a rotation of the work piece, and means controlled by the movement of said carriage for varying the effect of said rotatable pattern member.

14. A method of operating a lathe which comprises rotating a work piece at a cutting speed, advancing a cutter at a feed rate along the surface of the work piece, shifting the cutter continuously during portions of each revolution of the work piece in a direction at an angle to the direction of said advance, and holding the cutter at a fixed distance from the work piece at other portions of each revolution of the work piece.

15. A method of operating a lathe which comprises rotating a work piece at a cutting speed, advancing a cutter at a feed rate along the surface of the work piece, shifting the cutter continuously during portions of each revolution of the work piece in a direction at an angle to the direction of said advance, and retaining the cutter at its point of maximum travel from the axis of the work piece for any given revolution thereof during intermediate portions of each revolution of the work piece.

16. A method of operating a lathe which comprises rotating a work piece at a cutting speed, advancing a cutter at a feed rate along the surface of the work piece, shifting the cutter continuously during portions of each revolution of the work piece in a direction at an angle to the direction of said advance, retaining the cutter at its point of maximum travel from the axis of the work piece for any given revolution thereof during intermediate portions of each revolution of the work piece, and modifying the extent of movement of the cutter upon each revolution of the work piece as the cutter advances along the surface of the work piece.

RAYMOND V. BROMLEY.

CERTIFICATE OF CORRECTION.

Patent No. 2,225,409.   December 17, 1940.

RAYMOND V. BROMLEY.

It is hereby certified that error appears in the printed specification of the above numbered patent requiring correction as follows: Page 3, first column, line 13, for "toool" read --tool--; page 4, first column, line 45, for "effective" read --ineffective--; and that the said Letters Patent should be read with this correction therein that the same may conform to the record of the case in the Patent Office.

Signed and sealed this 11th day of February, A. D. 1941.

(Seal)

Henry Van Arsdale,
Acting Commissioner of Patents.